US008199148B2

(12) United States Patent  
Museth (10) Patent No.: US 8,199,148 B2  
(45) Date of Patent: Jun. 12, 2012

(54) SYSTEM AND METHOD FOR SURFACING OF PARTICLE SYSTEMS

(75) Inventor: Ken Museth, Marina Del Rey, CA (US)

(73) Assignee: Digital Domain Productions, Inc., Venice, CA (US)

( * ) Notice: Subject to any disclaimer, the term of this patent is extended or adjusted under 35 U.S.C. 154(b) by 985 days.

(21) Appl. No.: 12/185,043

(22) Filed: Aug. 1, 2008

(65) Prior Publication Data

US 2009/0040219 A1    Feb. 12, 2009

Related U.S. Application Data

(60) Provisional application No. 60/954,212, filed on Aug. 6, 2007.

(51) Int. Cl.  
 *G06T 15/00* (2011.01)

(52) U.S. Cl. ........ 345/423; 345/616; 345/630; 345/473; 264/414; 264/425; 264/628; 423/701; 430/325

(58) Field of Classification Search .................. 345/423, 345/616, 630, 474, 473, 475; 430/325; 264/414, 264/425, 628; 423/701  
See application file for complete search history.

(56) References Cited

U.S. PATENT DOCUMENTS 7,419,772 B2 *   9/2008   Watkins et al. ............... 430/325

OTHER PUBLICATIONS

Bajaj et al, Anisotropic Deffusion of Surfaces and Functions on Surfaces, ACM Transaction on Graphics, vol. 22, No. 1, Jan. 2003, pp. 4-32.*  
Yue et al, A Diffuse-Interface method for Simulating two-phase flows of complex Fluids, Journal Fluid Mech.,vol. 515, 2004, pp. 293-317.*  
Tessendorf, Simulating Ocean Water, SIGGRAPH 2002, pp. 1-19.*  
Ellero et al, Viscoelastic Flows Studied by Smoothed Particle Dynamics; Journal of Non-Newtonian Fluid Mechanics, 2002, pp. 35-51.*

* cited by examiner

*Primary Examiner* — Phu Nguyen  
(74) *Attorney, Agent, or Firm* — Perkins Coie LLP (57) ABSTRACT

A method and system for surfacing of particle systems is proposed to achieve high surface resolutions and low execution times, comprising partitioning particles into sub-blocks, each sub-block associated linear data arrays, sequentially accessing each array to composite the particles into a respective sub-volume using estimates of grid stencils derived from particle kernels, performing random-access into the sub-volumes, processing each linear array, and lexicographically pushing the corresponding sub-volume into a DT-Grid to convert the sub-volume to a narrow band level set. Further steps to improve the temporal coherence of resulting surface, to reduce artifacts from sparsely sampled regions of space, to enhance artistic expression, and for flexible post processing can be performed.

13 Claims, 8 Drawing Sheets

SYSTEM AND METHOD FOR SURFACING OF PARTICLE SYSTEMS

CROSS REFERENCE TO RELATED APPLICATIONS

This application claims priority to provisional application No. 60/954,212 entitled "Surfacing Particle Systems", filed Aug. 6, 2007, and which is incorporated by reference.

BACKGROUND OF THE INVENTION

"Particle system" refers to a computer graphics technique to simulate certain fuzzy phenomena, which are difficult to reproduce with conventional rendering techniques. Examples of phenomena commonly simulated with particle systems include fire, explosions, smoke, flowing water, sparks, falling leaves, clouds, fog, snow, dust, meteor tails, or abstract visual effects like glowing trails, magic spells, etc.

Smoothed Particle Hydrodynamics (SPH) is a computational method used for simulating fluid flows. The SPH method works by dividing the fluid into a set of discrete "fluid elements" or particles. These particles have a spatial distance (known as the "smoothing length", typically represented in equations by h), over which their properties are "smoothed" by a kernel function. This means that any physical quantity of any particle can be obtained by summing the relevant properties of all the particles which lie within two smoothing lengths.

By assigning each particle its own smoothing length and allowing the smoothing length to vary with time, the resolution of a simulation can be made to adapt itself depending on local conditions. For example, in a very dense region where many particles are close together the smoothing length can be made relatively short, yielding high spatial resolution. Conversely, in low-density regions individual particles are far apart and the resolution is low, optimizing the computation for the regions of interest. Previous approaches used static footprints for particles, such as spheres.

SPH is a popular technique in production environments because it allows fast simulations of fluid effects like splashes, filaments, and thin-sheets. These elements are computationally intensive to produce with grid based fluid solvers.

The traditional approach to surfacing particle systems uses Constructive Solid Geometry (CSG). CSG is a technique used in solid modeling that allows a modeler to create a complex surface or object by using Boolean operators to combine objects. Prior systems for surfacing particle systems use CSG blending of metaballs or spheres as particle footprints sampled on a dense, regular 3D grid. The metaballs or spheres would have fixed characteristics during the simulation. This severely limits the quality of the resulting surfaces due to resolution and computational overheads in both time and memory.

Consequently, SPH surfaces often have a characteristic "blobby" look that clearly reveals the underlying particles. The lack of a coherent "surface" is a disadvantage when simulating fluids such as water. Furthermore, particle systems are typically sparse and occupy large (empty) spaces, making them very inefficient to sample on dense, regular 3D grids.

To improve results, the number of particles in the particle system can be increased at the cost of additional computation resources. Alternatively, the size of each particle footprint can be increased at the cost of losing surface details, for example, by increasing the radius of each metaball.

Temporal aliasing occurs when temporal signals are discretely sampled over time, for example, a playback of images in an animation sequence. This results in flickering, incoherent popping of surfaces, or other artifacts. The artifacts increase with faster motion (i.e. high frequency) or low sampling-rates (i.e. frame-rates). A previous approach is to motion-blur (i.e. band-limit) the signal which typically amounts to blending of discrete samples (e.g. frames) acquired at different time.

The level set method is a numerical technique for tracking interfaces and shapes. The level set method allows numerical computations involving curves and surfaces on a fixed Cartesian grid without having to parameterize these objects. This also makes it easy to follow shapes that change topology, such as when a shape splits in two, develops holes, etc. These benefits make the level set method great for modeling time-varying objects, like inflation of an airbag, or a drop of oil floating in water.

A level set function takes positive values inside the region defined by a shape to be modeled and negative values outside. A level set data structure is designed to represent such level set functions efficiently.

DETAILED DESCRIPTION

A surfacing particle method and system achieves high surface resolutions, improved memory efficiency, and fast execution times through two anti-aliasing techniques. One technique is temporal anti-aliasing, which includes motion-blurring of particles based on particle velocities. Another technique is spatial anti-aliasing, which includes spatial diffusion of particles based on nearby neighbors. For example, each particle is replaced with an ellipsoid, and ellipsoid values are varied based on the location and density of the particle's neighbors.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Reduction of Computational Overhead

Figure 1:
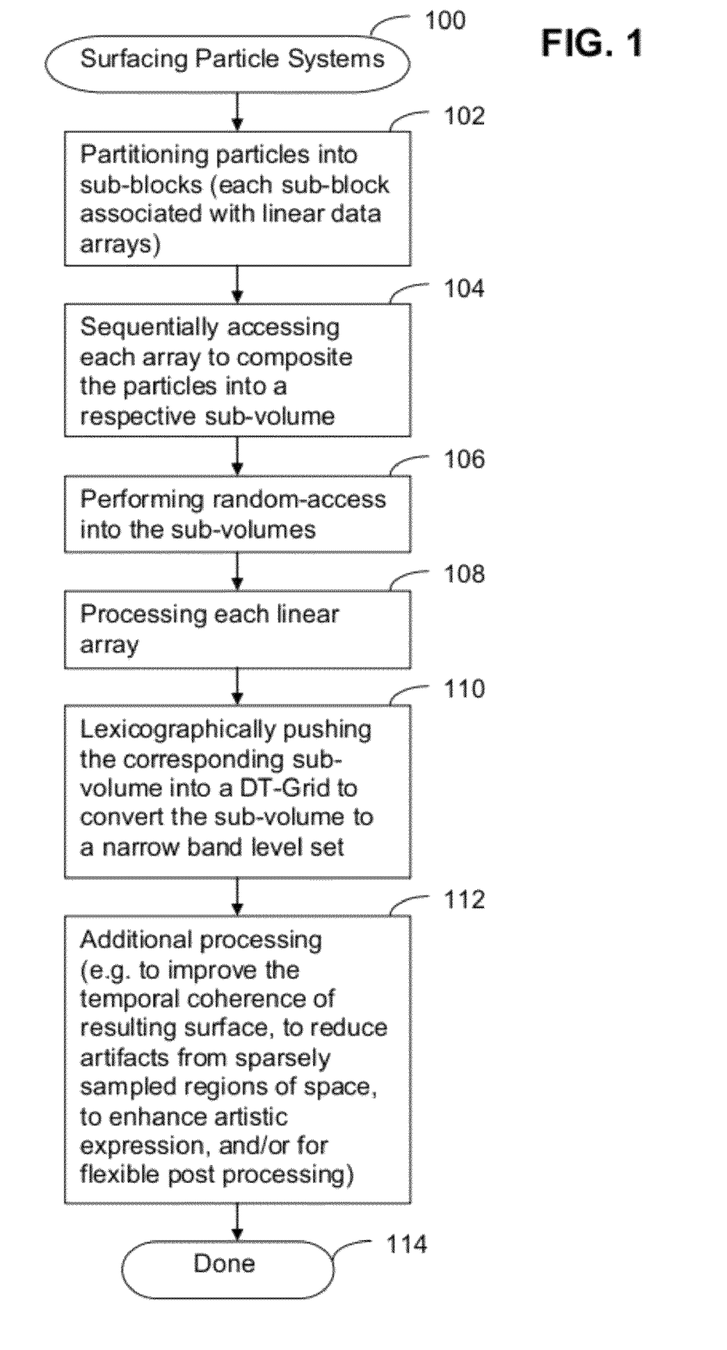
FIG. 1 depicts a flow diagram illustrating an example process of surfacing particle systems.

FIG. 1 depicts a flow diagram illustrating an example process of surfacing particle systems. To achieve high surface resolutions and low execution times, the algorithm starts by partitioning the particles into sub-blocks, each associated with simple but fast linear data arrays 102. Each array is sequentially accessed to composite the particles into the respective sub-volume using appropriate estimates of grid stencils derived from the particle kernels 104. This avoids typical nearest neighbor searches in slow tree data structures (e.g. KD-Trees), instead performing a fast, random-access into the dense sub-volume 106. After a linear array is processed 108, the corresponding sub-volume is lexicographically pushed into a very compact and efficient DT-Grid.

DT-Grid is further discussed in Nielsen, M. B., and Museth, K. 2006. Dynamic Tubular Grid: An efficient data structure and algorithms for high resolution level sets. Journal of Scientific Computing 26, 3, 261-299, and is incorporated by reference.

The DT-Grid is a compact data structure designed to provide a very low memory footprint, making it possible to represent higher resolution interfaces than other narrow band and tree based methods. The DT-Grid was specifically designed for the sequential access used in most level set algorithms and provides constant time access to grid points within the stencil. The DT-Grid essentially converts the dense sub-volume to a narrow band level set 110.

Since only a single dense sub-volume is allocated at any time, the overall memory bottleneck is effectively the DT-Grid. Because the DT-Grid is both time and memory efficient compared to other narrow-band and tree-based algorithms for level set surfaces, these data structures and algorithms result in more efficient data processing compared to prior approaches. This approach is capable of representing implicit particle surfaces of effective resolutions exceeding $5000^3$. For lower resolutions (i.e. $100^3$ to $300^3$), this algorithm achieves interactive performance.

Additional processing 112 can be performed to further improve various aspects of surfacing of particle systems. To improve the temporal coherence of resulting surface, the velocity of the particles can be utilized, as further discussed below. To reduce artifacts from sparsely sampled regions of space, the implicit particle kernels corresponding to anisotropic diffusion of meta-balls (e.g. ellipsoids vs. spheres) can be blurred, as further discussed below.

Animated Geometric Texturing

Instead of utilizing static footprints (such as metaballs or spheres), particle footprints can use arbitrary geometries to improve simulation results. Each particle footprint in the particle system is replaced with a desired geometry or shape, which can vary with time.

By utilizing memory structures such as DT Grid that provide high resolution particle system simulations, arbitrary shapes can be represented by level sets. This is an improvement over prior systems utilizing dense 3D grids and meta-balls (like spherical Gaussian distributions) by producing better simulation results.

By utilizing arbitrary geometries that vary with time, better simulations can be executed to surface dynamic systems such as fluids. Particle footprints can be changed during an animation sequence as simulated physical properties change. For example, surfacing a fluid with increasing viscosity can be achieved with curvature-based flow of predefined droplet footprints.

In another example, complex animations, such as object breakup and fracturing, can be better simulated by varying the geometry of the particle footprint over time as simulated properties change.

In addition, geometries or shapes can be predefined to animate or morph from one to another (through level set techniques) and then used as time-dependent particle footprints in the particle system. This improves artistic control over the simulation.

Utilizing arbitrary geometries as particle footprints can improve simulation results where a number of particles is too low. By varying the particle footprint geometries, surface detail can be added to a simulation. This eliminates the need to increase a number of particles in the particle system and the associated increase in computational resources required for simulation.

It will be appreciated the above technique can be combined with temporal and spatial anti-aliasing, as discussed.

Flexible Post-Processing

For added flexibility, a large toolbox of techniques can be used. This includes morphological operations to remove holes or disconnected pieces. One example is a Godunov-flux sweeping approach that combines tracing the characteristics with Godunov construction and Gauss-Seidel iterations with smart choices of different updating sequences. The Godunov flux with reduced complexity for evaluating the Godunov Hamiltonian may be incorporated into a simple Gauss-Seidel type iteration procedure to compute geodesic distances on graphs of functions. Further, the above technique can solve an Eikonal equation. The Eikonal equation is a non-linear partial differential equation used to normalize level sets as signed Euclidean distance fields.

Other examples include developing and using a set of level set speed functions for automatic blending, smoothing, sharpening, openings/closings, and embossing to be performed on level set models and implementing morphological and volumetric CSG operators to fill out modeling environment. By using the level set framework, it prevents self-intersection, which guarantees the generation of physically-realizable, simple, closed surfaces. Also, level set models easily change topological genus, and are free of the edge connectivity and mesh quality problems associated with mesh models.

The other example is surface smoothing by means of mean-curvature based level set flow. Polygons can be extracted very quickly due to the use of narrow bands, and the resulting mesh can be filtered by any number of mesh editing tools. Different combinations of these techniques can be used to create dramatic fluid splashing effects.

Figure 2:
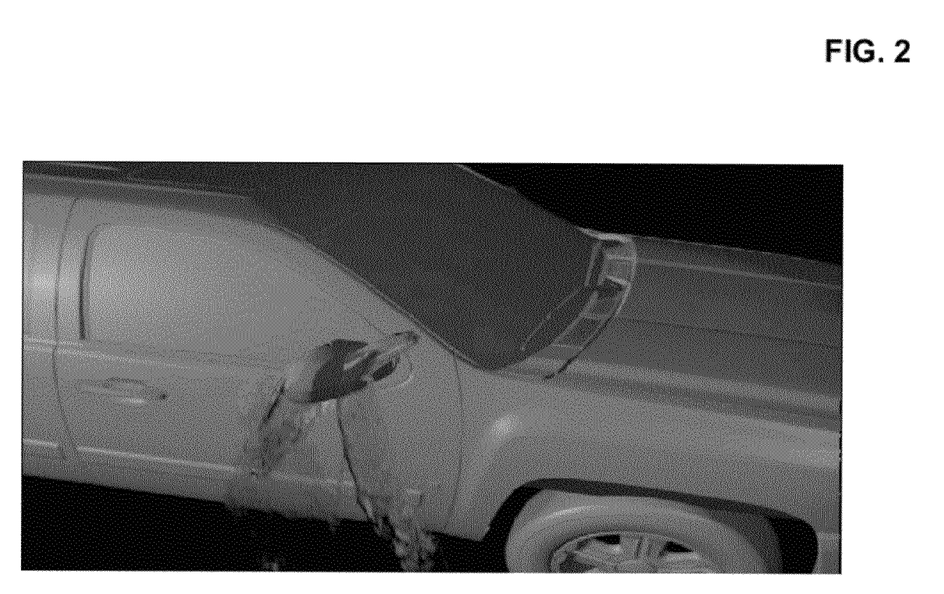
FIG. 2 is an illustration of an exemplary image (i.e., Smoothed Particle Hydrodynamics fluids on a car) using the proposed surfacing particle system with an effective resolution of $500^3$.

FIG. 2 is an illustration of an exemplary image (i.e., Smoothed Particle Hydrodynamics fluids on a car) using the proposed surfacing particle system with an effective resolution of $500^3$.

Figure 3:
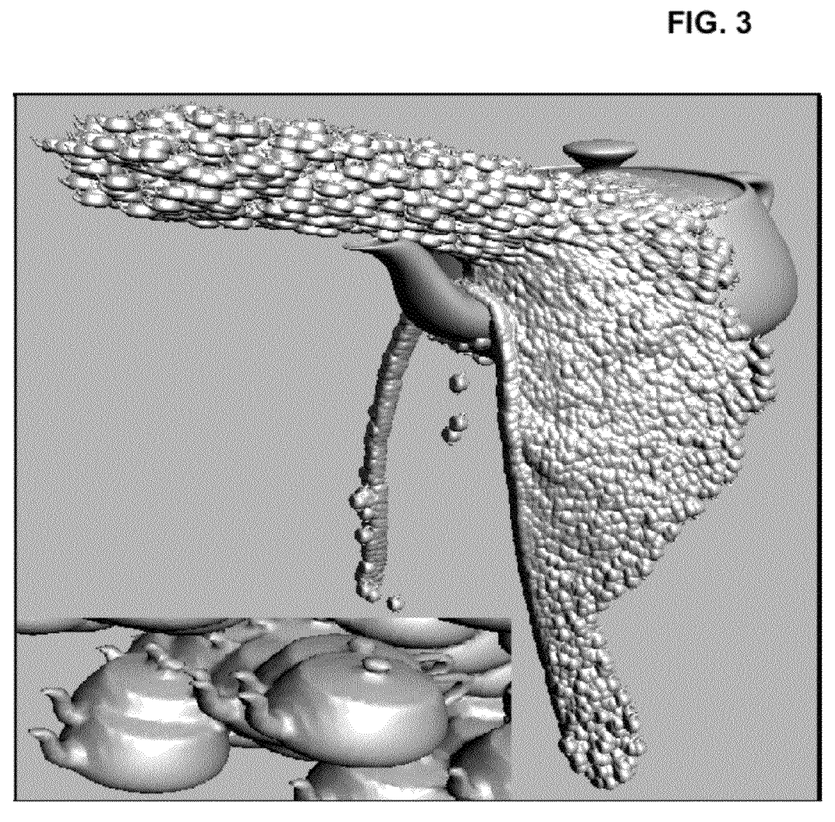
FIG. 3 is an illustration of an exemplary image (i.e., a teapot sprayed with micro-teapots) using the proposed surfacing particle system with an effective resolution of $2000^3$.

FIG. 3 is an illustration of an exemplary image (i.e., a teapot sprayed with micro-teapots) using the proposed surfacing particle system with an effective resolution of $2000^3$.

Figure 4:
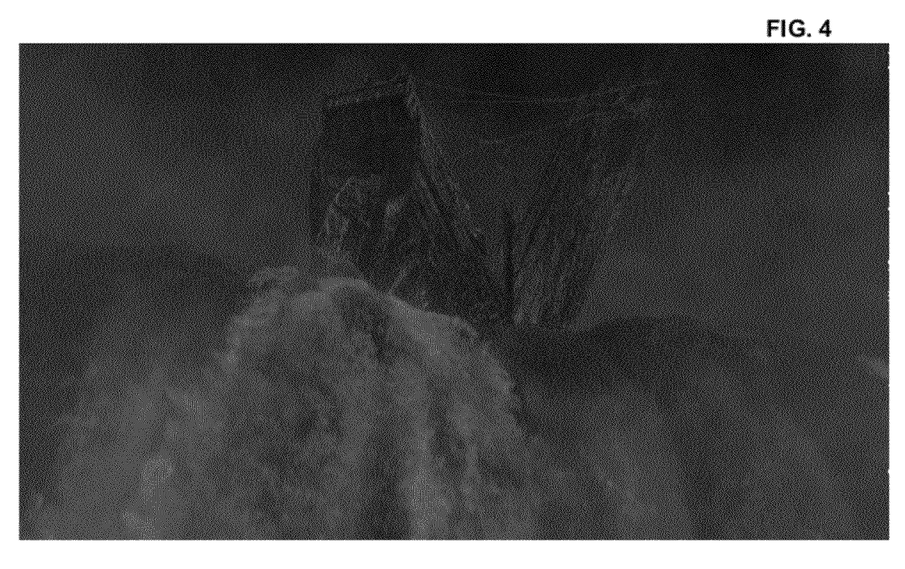
FIG. 4 is an illustration of an exemplary image (i.e., ship going over a waterfall) using the proposed surfacing particle system with an effective resolution of $2000^3$.

FIG. 4 is an illustration of an exemplary image (i.e., ship going over a waterfall) using the proposed surfacing particle system with an effective resolution of $2000^3$.

Figure 5A:
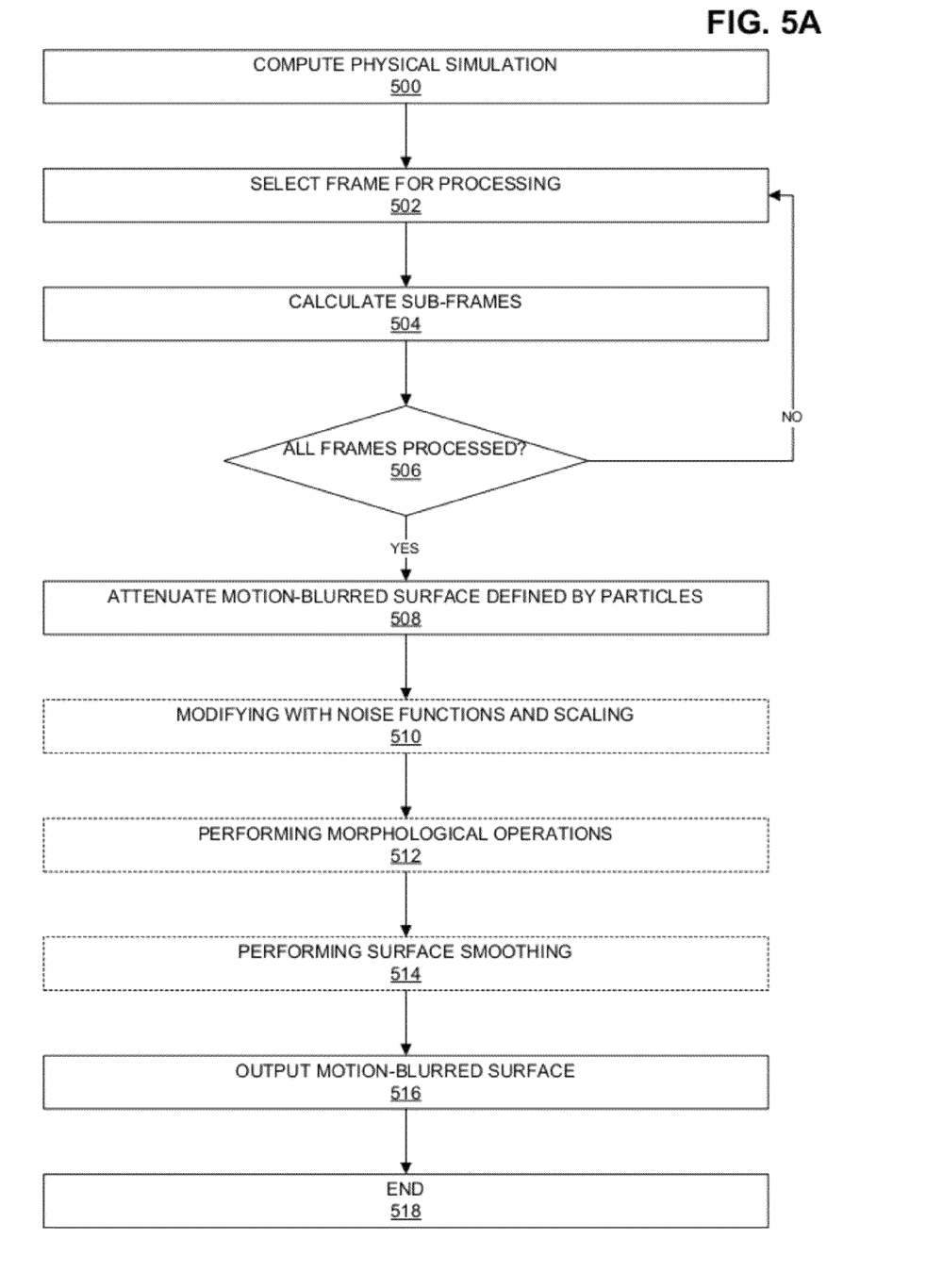
FIG. 5A illustrates a procedure for temporal anti-aliasing for fluid simulations.
Figure 7:
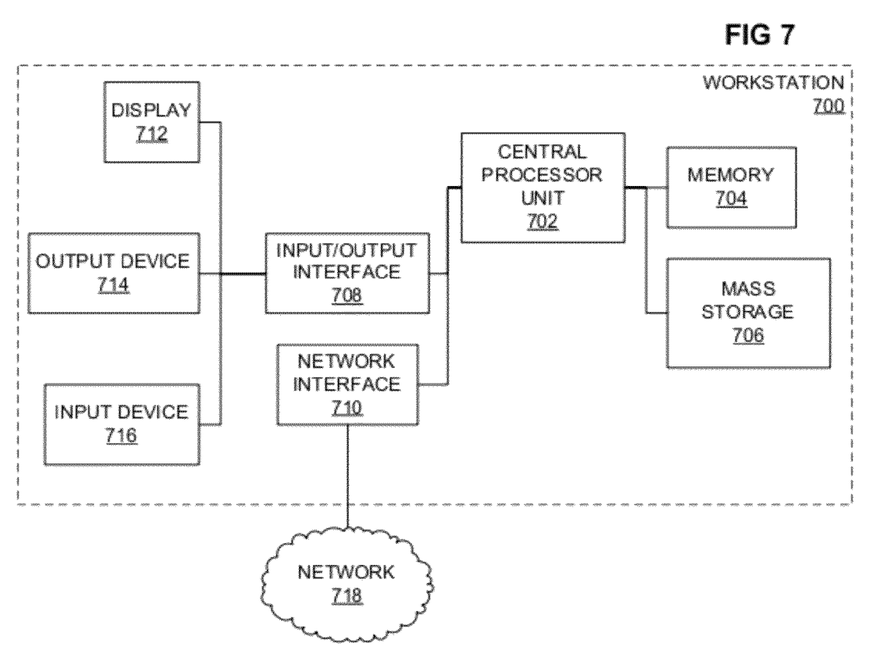
FIG. 7 illustrates an example system for surfacing particle systems.

FIG. 5A illustrates a procedure for temporal anti-aliasing for fluid simulations. The procedure can execute on a workstation as depicted in FIG. 7 and produce a motion-blurred surface of a fluid system while avoiding the problems discussed above.

To improve temporal coherence of a resulting surface, the velocity of the particles can be utilized in a blurring function. In one embodiment, each particle kernel is extended backward and forward in time, imitating the hyperbolic information flow characteristic of fluid advection. This is achieved by means of the particle velocities computed during the SPH simulation. This process can be further augmented with noise functions and scaling to obtain various artistic effects.

For a specified frame in an animation sequence, the particles are first moved forward and back in time relative to the temporal snapshot of the specified frame. In the above example, the particle movements are easily determined from the incompressible fluid velocities used in the SPH simulation.

Alternatively, particle velocities can be interpolated from the discrete samples of the SPH simulations, generating "sub-frames" of the particles. Particle velocities can be generated from space and time locations of the sub-frames.

A particle footprint is then attenuate or scaled along the sub-frames to generate a single motion-blurred surface. The surface is defined by the particle's movement over time, or by edges of a particle kernel as the particle moves over time. Attenuation emphasizes the direction of time (i.e. information) propagation by allowing the footprints to decrease as time passes, similar to the trailing of trajectories.

The discussed technique greatly reduces artifacts such as popping, especially when the modeled particles are moving rapidly.

In 500, the workstation can compute a physical simulation of a requested particle system. The particle system can be configured to simulate a fluid, such as water. Various approaches can be utilized to compute the physical simulation, as discussed above. The fluid can be represented by a plurality of particles, and the particle movements and characteristics are simulated.

For example, the physical simulation can be computed with a smoothed particle hydrodynamics system. The particle system can be stored in a level set data structure residing in an accessible memory. By utilizing a level set data structure, various level set operations can be used, for example, to smooth a surface represented by the particle system.

In 502, the workstation can select a frame for processing. The physical simulation can be divided into a plurality of frames that form an animation sequence. The selected frame includes a plurality of particles of the particle system. Each particle is associated with a location and velocity in each frame, as computed by the physical simulation.

In 504, the workstation computes a plurality of sub-frames for each particle in the selected frame. The sub-frames include a particle velocity for the particle, which can be interpolated from discretely sampling particle positions at time intervals, or extracted from the simulation. The sub-frames also include a particle location for the particle.

In 506, the workstation tests whether all frames from the physical simulation have been processed. If all frames have been processed, the workstation proceeds to 508. If not all frames have been processed, the workstation returns to 502, where another frame is selected for processing.

In 508, the workstation attenuates the motion-blurred surface defined by the particles in the plurality of sub-frames, as discussed above.

In 510, the workstation optionally modifies the motion-blurred surface with noise functions and scaling. For example, the noise functions and scaling can be used to create a more realistic surface.

In 512, the workstation optionally performs morphological operations on the motion-blurred surface. For example, the morphological operations can be used to create a more realistic surface.

In 514, the workstation optionally performs surface smoothing on the motion-blurred surface. For example, the surface smoothing can be used to create a more realistic surface.

In 516, the workstation optionally outputs the motion-blurred surface. The motion-blurred surface can be outputted as an animation sequence and stored in an accessible memory or displayed to the user.

In 518, the workstation exits the procedure.

Figure 5B:
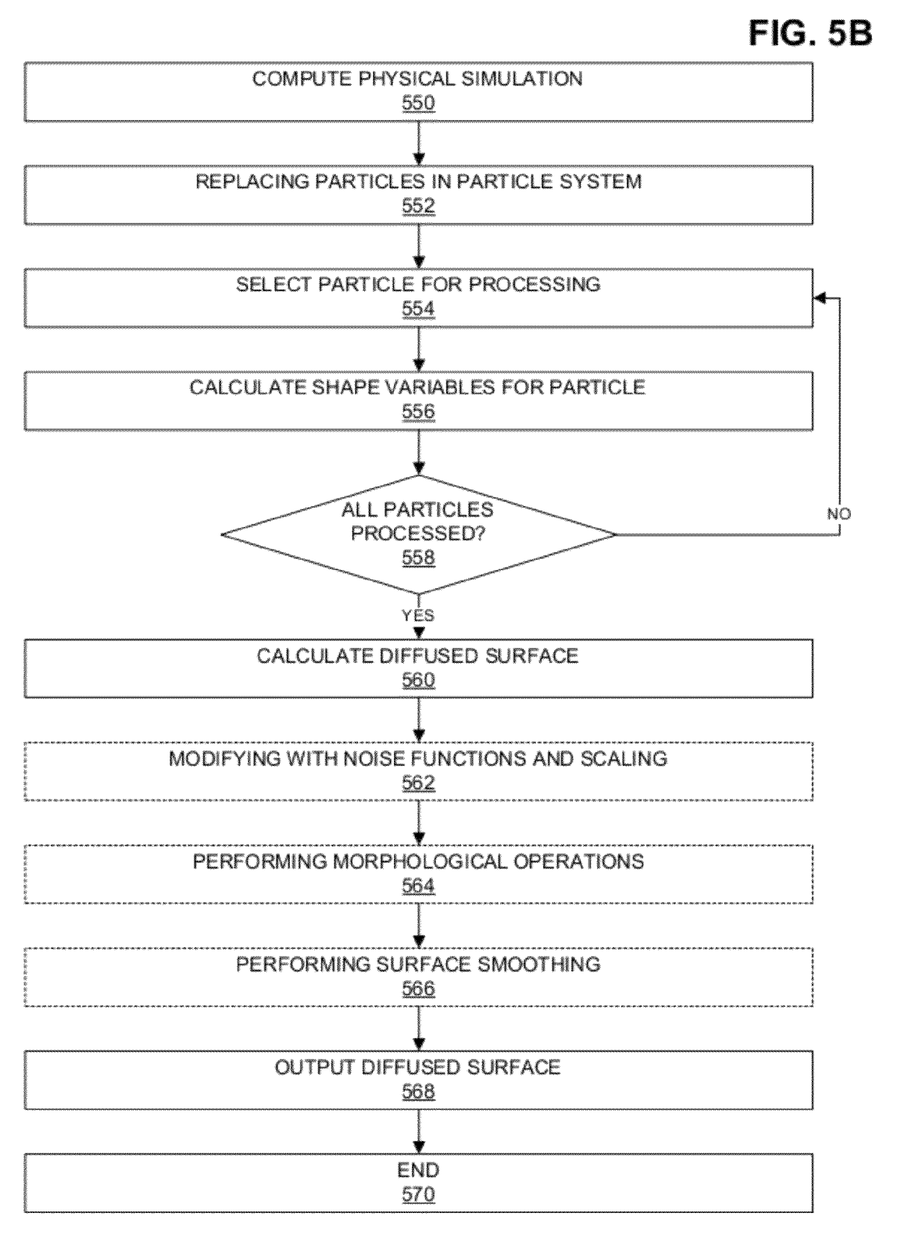
FIG. 5B illustrates a procedure for spatial anti-aliasing for fluid simulations.

FIG. 5B illustrates a procedure for spatial anti-aliasing for fluid simulations. The procedure can execute on a workstation as depicted in FIG. 7 and produce a diffused surface of a fluid system while avoiding the problems discussed above.

To reduce artifacts from sparsely sampled regions of space, particle kernels are modified from previous approaches to reflect anisotropic diffusion. Thus, particle kernel footprints are ellipsoids, instead of spheres. One embodiment may be based on diffusion-tensor analysis of the particle densities.

A rotationally invariant anisotropy measure can be used to generate scalar volumes that characterize the total diffusivity and diffusion anisotropy. By applying level set modeling and segmentation techniques to the derived scalar volumes, geometric models with reduced artifacts could be created. Various initialization processes, e.g. low-pass Gaussian filtering, and topological or logical operations to improve the initialization surface may be used before the actual level set deformation in order to produce the desired result.

Each pair of neighboring particles defines an axis of connection and a distance. This defines an orthonormal frame of reference $\{\vec{e}^1, \vec{e}^2, \vec{e}^3\}$ (where $\vec{e}^i = \{e_x^i, e_y^i, e_z^i\}$) and the major axis of a predefined ellipsoid $\{\lambda_1, \lambda_2, \lambda_3\}$ representing the two-body interaction. This information is next transformed into a tensor representation by means of the following algebraic expression:

$$H = \begin{pmatrix} e_x^1 & e_y^1 & e_z^1 \\ e_x^2 & e_y^2 & e_z^2 \\ e_x^3 & e_y^3 & e_z^3 \end{pmatrix} \cdot \begin{pmatrix} \lambda_1 & 0 & 0 \\ 0 & \lambda_2 & 0 \\ 0 & 0 & \lambda_3 \end{pmatrix} \cdot \begin{pmatrix} e_x^1 & e_x^2 & e_x^3 \\ e_y^1 & e_y^2 & e_y^3 \\ e_z^1 & e_z^2 & e_z^3 \end{pmatrix} \quad (1)$$

The resulting positive definite 3×3 matrix H is a tensor of rank 2. Multi-particle interactions are then represented as linear combinations of these two-particle interactions. The linear scaling for this combination, $w_\alpha$, is derived from the distance between the pair of particles. (Alternative expressions can be used, but should be a monotonically decreasing function of the particle distance). $\tilde{H}$ is computed as the linear combination of all two-particle interaction in a local neighborhood N:

$$\tilde{H} = \sum_{\alpha \in N} w_\alpha H_\alpha$$

Figure 6:
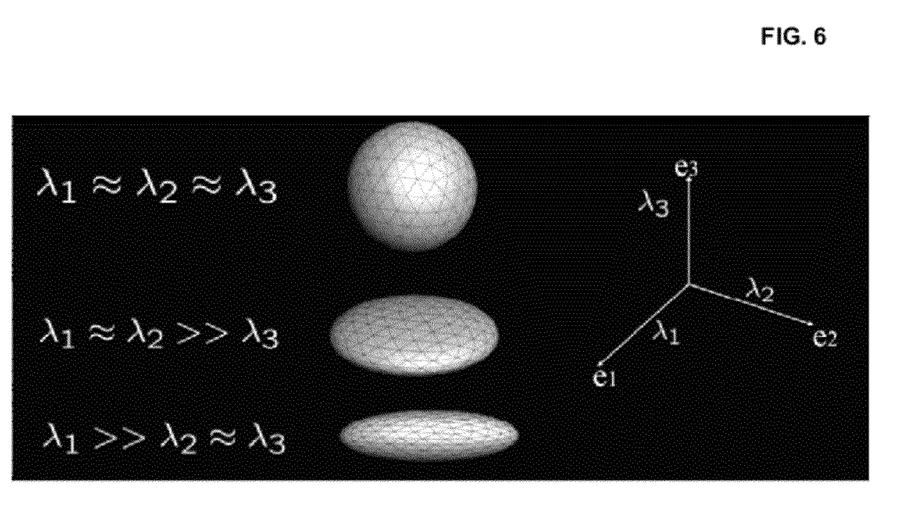
FIG. 6 illustrates an example system for surfacing particle systems.

Since $\tilde{H}$ is also a symmetric and positive definite 3×3 matrix, it can subsequently be decomposed into its Cartesian eigen-representation $$\begin{pmatrix} \tilde{e}_x^1 & \tilde{e}_x^2 & \tilde{e}_x^3 \\ \tilde{e}_y^1 & \tilde{e}_y^2 & \tilde{e}_y^3 \\ \tilde{e}_z^1 & \tilde{e}_z^2 & \tilde{e}_z^3 \end{pmatrix} \cdot \tilde{H} \cdot \begin{pmatrix} \tilde{e}_x^1 & \tilde{e}_y^1 & \tilde{e}_z^1 \\ \tilde{e}_x^2 & \tilde{e}_y^2 & \tilde{e}_z^2 \\ \tilde{e}_x^3 & \tilde{e}_y^3 & \tilde{e}_z^3 \end{pmatrix} = \begin{pmatrix} \tilde{\lambda}_1 & 0 & 0 \\ 0 & \tilde{\lambda}_2 & 0 \\ 0 & 0 & \tilde{\lambda}_3 \end{pmatrix} \quad (3)$$

where $\{\tilde{\vec{e}}^1, \tilde{\vec{e}}^2, \tilde{\vec{e}}^3\}$ and $\{\tilde{\lambda}_1, \tilde{\lambda}_2, \tilde{\lambda}_3\}$ are respectively the eigenvectors and eigenvalues of the diffusion tensor $\tilde{H}$. This eigensystem is then used to scale and orient diffusion ellipsoids that act as anisotropic footprints for the particles (see FIG. 6).

In 550, the workstation can compute a physical simulation of a requested particle system. The particle system can be configured to simulate a fluid, such as water. Various approaches can be utilized to compute the physical simulation, as discussed above. The fluid can be represented by a plurality of particles, and the particle movements and characteristics are simulated.

For example, the physical simulation can be computed with a smoothed particle hydrodynamics system. The particle system can be stored in a level set data structure residing in an accessible memory. By utilizing a level set data structure, various level set operations can be used, for example, to smooth a surface represented by the particle system.

In 552, the workstation can replace the particles in the particle system. Instead of spherical particles, such as metaballs used in previous systems, anisotropic shapes can be used. An example anisotropic shape can be an ellipsoid.

In 554, the workstation selects a particle for processing in the particle system. The particle is now an anisotropic shape, as replaced in 552.

In 556, the workstation calculations shape variables for the selected particle. For example, an ellipsoid has three shape variables, one along each axis. The shape variables can be calculated with tensor algebra, as discussed above, based on locations of neighbors and density of neighbors.

In 558, the workstation tests whether all particles have been processed. If all particles have been processed, the workstation proceeds to 560. If not all particles have been processed, the workstation returns to 554, where another particle is selected for processing.

In 560 the workstation calculates a diffused surface from the anisotropic shapes in the particle system, wherein each anisotropic shape is defined by its calculated shape variables. The combined surface of all anisotropic shapes is the diffused surface.

In 562, the workstation optionally modifies the diffused surface with noise functions and scaling. For example, the noise functions and scaling can be used to create a more realistic surface.

In 564, the workstation optionally performs morphological operations on the diffused surface. For example, the morphological operations can be used to create a more realistic surface.

In 566, the workstation optionally performs surface smoothing on the diffused surface. For example, the surface smoothing can be used to create a more realistic surface.

In 568, the workstation optionally outputs the diffused surface. The motion-blurred surface can be outputted as an animation sequence and stored in an accessible memory or displayed to the user.

In 570, the workstation exits the procedure.

FIG. 6 illustrates an example ellipsoid and ellipsoid variables. Each of e1, e2, and e3 represents a major axis of the ellipsoid. Each of $\lambda_1, \lambda_2, \lambda_3$ represents a ellipsoid value along a major axis. Thus, it can be seen that when $\lambda_1 \approx \lambda_2 \approx \lambda_3$, the resulting ellipsoid is sphere-like. When $\lambda_1 \approx \lambda_2 \gg \lambda_3$, the resulting ellipsoid is flat and pancake-like. When $\lambda_1 \gg \lambda_2 \approx \lambda_3$, the resulting ellipsoid is long and cigar-like. This allows particle footprints to vary within a particle system, creating a smoother and more coherent surface.

FIG. 7 illustrates an example system for surfacing particle systems. The system can include a workstation 700 that includes a central processor unit (CPU) 702, a memory 704, a mass storage 706, an input/output interface 708, a network interface 710, a display 712, an output device 714, and an input device 716. The workstation 700 can communicate with a network 718. The workstation 700 can be configured to execute anti-aliasing procedures, as discussed above.

In the example of FIG. 7, the workstation 700 can be a computing device such as a personal computer, desk top, laptop, or other computer. The workstation can be accessible to a user and provide a computing platform for particle system simulation software. The workstation can be configured to provide high performance with respect to simulation capabilities, processing power, memory capacity, and multitasking ability. Alternatively, any computing device can be used, such as a mobile computer or any other device.

In the example of FIG. 7, the CPU 702 can be an integrated circuit configured for mass-production and suited for a variety of computing applications. The CPU 702 can interface with a motherboard within the workstation 700 and control other workstation components. The CPU 702 can communicate with the other workstation components via a bus, a physical interchange, or other communication channel.

In the example of FIG. 7, the memory 704 can include volatile and non-volatile memory accessible to the CPU 702. The memory 704 can be random access and provide fast access for graphics-related or other calculations. In addition, the CPU 702 can also include on-board cache memory for faster performance.

In the example of FIG. 7, the mass storage 706 can be volatile or non-volatile storage configured to store large amounts of data, such as a graphics file. The mass storage 706 can be accessible to the CPU 702. For example, the mass storage 706 can be a hard drive, a RAID array, flash memory, CD-ROMs, DVDs, HD-DVD or Blu-Ray mediums.

In the example of FIG. 7, the input/output interface 708 can include logic and physical ports used to connect and control peripheral devices, such as input and output devices. For example, the input/output interface 708 can allow input and output devices to be connected to the workstation and interface between the devices and the workstation.

In the example of FIG. 7, the network interface 710 can include logic and physical ports used to connect to one or more networks. For example, the network interface 710 can accept a physical network connection and interface between the network and the workstation by translating communications between the two. Example networks can include Ethernet, or other physical network infrastructure.

In the example of FIG. 7, the display 712 can be is electrical equipment which displays viewable images generated by the workstation to the user. For example, the display 712 can be a cathode ray tube or some form of flat panel such as a TFT LCD. The display 712 includes the display device, circuitry to generate a picture from electronic signals sent by the computer, and an enclosure or case. The display 712 can interface with the input/output interface which converts data to a format compatible with the display.

In the example of FIG. 7, the output device 714 can be any hardware used to communicate computation results to the user. For example, the output device 714 can include speakers and printers, in addition to the display discussed above.

In the example of FIG. 7, the input device 716 can be any computer hardware used to translate inputs received from the user into data usable by the workstation. The input device 716 can include keyboards, mouse pointer devices, microphones, scanners, video and digital cameras, etc.

In the example of FIG. 7, the network 718 can be any network configured to carry digital information. For example, the network 718 can be an Ethernet network, the Internet, or any Local Area Network or Wide Area Network.

In an alternative, the workstation 700 can be a client device in communications with a server over the network. In this example, the client device can be configured for lower performance (and thus have a lower hardware cost) and the server provides necessary processing power.

In the example of FIG. 7, in operation, the workstation 700 can execute the simulation and anti-aliasing procedures discussed above. Outputs can be stored in mass storage 706 or displayed on the display 712.

As discussed above, one embodiment of the present invention can be a method for temporal anti-aliasing in a particle system simulation. The method comprises computing a physical simulation with a particle system. The method comprises calculating a plurality of sub-frames from a particle velocity and a particle position, wherein each sub-frame includes at least one of: a particle position at an earlier time and a particle position at a later time. The method comprises attenuating a surface defined by the particle in the plurality of sub-frames into a motion-blurred surface. The method comprises outputting the motion-blurred surface. The particle velocity can be at least one of: interpolated from discretely sampling particle positions at time intervals and extracted from the physical simulation. The outputting can be at least one of: writing the motion-blurred surface to an accessible memory and displaying the motion-blurred surface to a user. The physical simulation can be computed with a smoothed particle hydrodynamics system. The method comprises modifying the motion-blurred surface with noise functions and scaling. The particle system can be stored in a level set data structure residing in an accessible memory. The method comprises performing morphological operations on the level set data structure to remove holes and disconnected pieces of the motion-blurred surface. The method comprises performing a surface smoothing on the level set data structure with a mean-curvature based level set flow.

Another embodiment of the present invention can be a method for spatial anti-aliasing in a particle system. The method comprises computing a physical simulation with a particle system. The method comprises replacing particles within the particle systems with anisotropic shapes, wherein each anisotropic shape is associated with a plurality shape variables. The method comprises calculating each shape variable for each anisotropic shape based on its position relative to neighbors and a neighbor density. The method comprises diffusing the anisotropic shapes in accordance to the calculated shape variable, wherein the diffused anisotropic shapes form a diffused surface. The method comprises outputting the diffused surface. The shape variables for each anisotropic shape can be calculated with tensor algebra. Each anisotropic shape can be an ellipsoid. The physical simulation can be computed with a smoothed particle hydrodynamics system. The method comprises modifying the diffused surface with noise functions and scaling. The particle system can be stored in a level set data structure residing in an accessible memory. The method comprises performing morphological operations on the level set data structure to remove holes and disconnected pieces in the diffused surface. The method comprises performing a surface smoothing on the level set data structure with a mean-curvature based level set flow.

Another embodiment of the present invention can be a system for performing anti-aliasing in a particle system. The system comprises a memory, the memory storing a level set data structure representing a particle system. The system comprises a processor. The processor is configured to compute a physical simulation with the particle system. The processor is configured to calculate a plurality of sub-frames from a particle velocity and a particle position, wherein each sub-frame includes at least one of: a particle position at an earlier time and a particle position at a later time. The processor is configured to attenuate a surface defined by the particle in the sub-frames into a motion-blurred surface. The processor is configured to replace particles within the particle systems with anisotropic shapes, wherein each anisotropic shape is associated with shape variables. The processor is configured to calculate shape variables for each anisotropic shape based on its position relative to neighbors and a neighbor density. The processor is configured to diffuse the anisotropic shapes in accordance to the calculated shape variable into a diffused surface. The processor is configured to blend the motion-blurred surface and the diffused surface into a generated surface. The processor is configured to output the generated surface. The physical simulation can be computed with a smoothed particle hydrodynamics system. The processor is configured to modify the generated surface with noise functions and scaling. The processor is configured to perform morphological operations on the generated surface to remove holes and disconnected pieces.

The foregoing description of the preferred embodiments of the present invention has been provided for the purposes of illustration and description. It is not intended to be exhaustive or to limit the invention to the precise forms disclosed. Many combinations, modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for spatial anti-aliasing in a particle system, comprising:
    computing a physical simulation with a particle system, wherein the particle system includes a plurality of particles, and wherein each of the plurality of particles retains a static shape during computation of the physical simulation;
    subsequent to completion of the physical simulation, replacing particles within the particle system with dynamic shapes, wherein each dynamic shape is associated with a plurality of shape variables;
    calculating each shape variable for each dynamic shape based on its position relative to neighbors and a neighbor density;
    diffusing the dynamic shapes in accordance to the calculated shape variables, wherein the diffused dynamic shapes form a diffused surface; and
    outputting the diffused surface.

2. The method of claim 1, wherein the shape variables for each dynamic shape is calculated with tensor algebra.

3. The method of claim 1, wherein each dynamic shape is an ellipsoid.

4. The method of claim 1, wherein the physical simulation is computed with a smoothed particle hydrodynamics system.

5. The method of claim 1, further comprising:
    modifying the diffused surface with noise functions and scaling.

6. The method of claim 1, wherein the particle system is stored in a level set data structure residing in an accessible memory.

7. The method of claim 6, further comprising:
    performing morphological operations on the level set data structure to remove holes and disconnected pieces in the diffused surface.

8. The method of claim 1, further comprising:
    performing a surface smoothing on the level set data structure with a mean-curvature based level set flow.

9. The method of claim 1, wherein particles in the particle systems are spheres.

10. The method of claim 1, wherein particles in the particle systems vary over time.

11. A method for spatial anti-aliasing in a particle system, comprising:

computing a physical simulation with a particle system, wherein the particle system includes a plurality of particles, and wherein each of the plurality of particles retains a static shape during computation of the physical simulation; and outputting the physical simulation as a diffused surface, wherein:

particles within the particle system are replaced with dynamic shapes, wherein each dynamic shape is associated with a plurality of shape variables;

each shape variable for each dynamic shape is calculated based on each dynamic shape's position relative to neighbors and a neighbor density; and the dynamic shapes are diffused in accordance to the calculated shape variables, wherein the diffused dynamic shapes form a diffused surface.

12. The method of claim 11, wherein the computation of physical simulation involves generating a plurality of simulation frames.

13. A method for spatial anti-aliasing in a particle system, comprising:

computing a plurality of simulation frames with a particle system, wherein the particle system includes a plurality of particles, each of the plurality of particles representing a spatial area in a given simulation frame and wherein each of the plurality of particles retains a static shape during computation of each of the plurality of simulation frames; and outputting each of the plurality of simulation frames previously computed as a diffused surface, wherein:

particles in a given simulation frame are replaced with dynamic shapes, wherein each dynamic shape is associated with a plurality of shape variables;

each shape variable for each dynamic shape is calculated based on each dynamic shape's position relative to neighbors and a neighbor density; and the dynamic shapes are diffused in accordance to the calculated shape variables, wherein the diffused dynamic shapes form a diffused surface.

* * * * *